United States Patent [19]

Greenfield, Jr. et al.

[11] 4,366,920
[45] Jan. 4, 1983

[54] DEMAND PREPARATION SOLUBLE COFFEE URN

[76] Inventors: Irving E. Greenfield, Jr., 5331 SW. 92 Ave., Miami, Fla. 33156; Ronald C. Jacobson, 14500 Kendale Lakes Blvd., Miami, Fla. 33183

[21] Appl. No.: 865,324

[22] Filed: Dec. 28, 1977

[51] Int. Cl.$^3$ .................. B67D 5/60; B67D 5/62
[52] U.S. Cl. .................. 222/145; 99/285; 222/146 HE; 222/413
[58] Field of Search .................. 222/129.1–129.4, 222/135, 145, 148, 156, 157, 146 R, 146 H, 146 HE, 333, 412, 413, 564, 460, 461; 99/285, 289 R, 291, 293, 316; 220/254, 255; 98/45, 46

[56] References Cited

U.S. PATENT DOCUMENTS

| | | | |
|---|---|---|---|
| 2,568,840 | 9/1951 | Zees | 99/291 X |
| 3,084,613 | 4/1963 | Maxson | 222/146 HE X |
| 3,291,033 | 12/1966 | Curtis et al. | 99/291 X |
| 3,517,603 | 6/1970 | Bruenjes et al. | 99/291 X |
| 3,568,887 | 3/1971 | Jacobs et al. | 222/129.4 X |
| 3,805,999 | 4/1974 | Syverson | 222/129.4 |
| 3,822,810 | 7/1974 | Fuqua | 222/146 HE |
| 4,015,749 | 4/1977 | Arzberger et al. | 222/129.4 X |

Primary Examiner—Joseph J. Rolla
Assistant Examiner—Fred A. Silverberg
Attorney, Agent, or Firm—Harvey B. Jacobson

[57] ABSTRACT

A demand preparation soluble coffee urn utilized as a replacement for conventional roasted coffee urns and constructed in a manner to closely simulate a roasted coffee urn as to size, shape, appearance, exterior configuration and provided with plumbing and electrical fittings to enable it to occupy the same position as a roasted coffee urn, thereby facilitating the use of freeze-dried coffee in institutional feeding operations, restaurants, fast food shops, cafeterias, coffee shops, diners, and the like. The soluble coffee urn includes a structure for storing and dispensing coffee powder, mixing it with hot water and discharging coffee into a cup or other suitable receptacle upon demand, that is, as long as an actuating handle is operated and to provide single or double-sided service with one or more products, including hot water, being dispensed from either or both sides of the urn.

26 Claims, 10 Drawing Figures

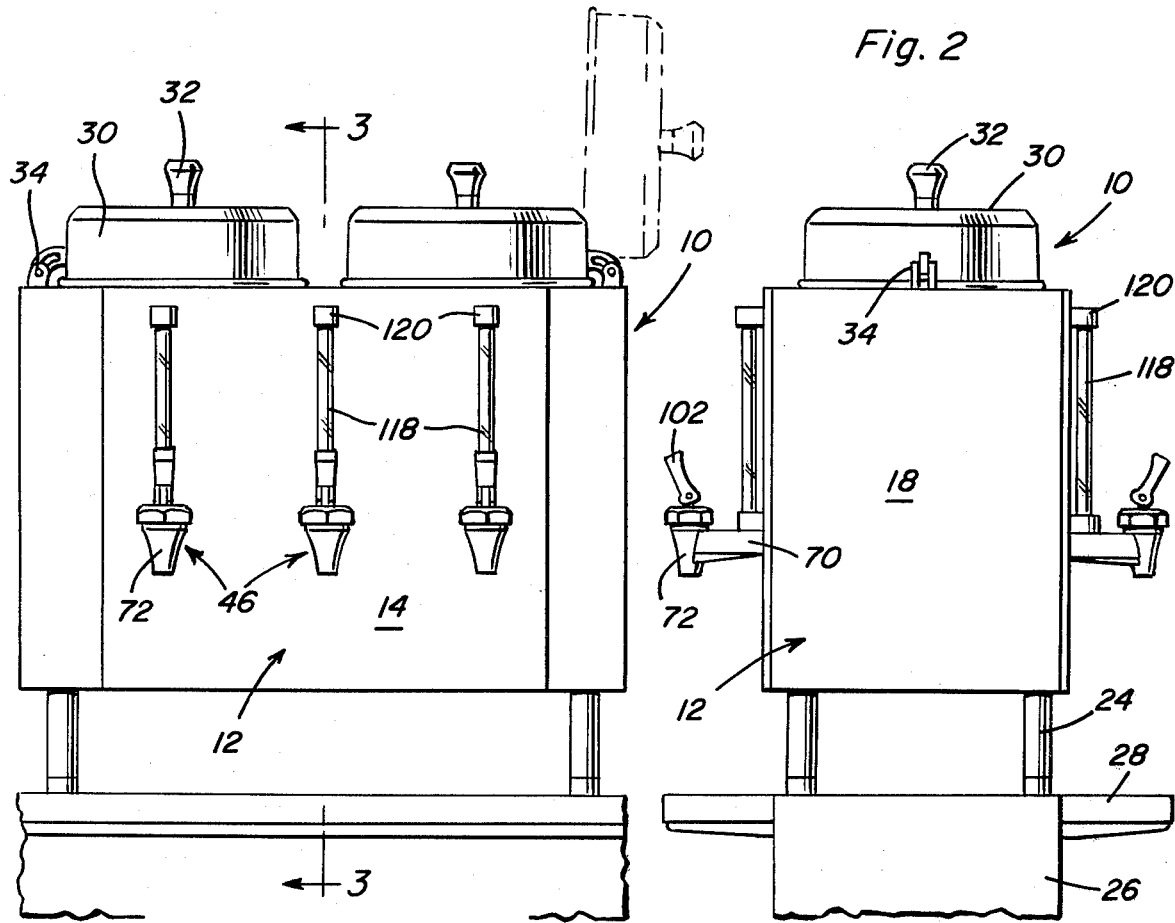
Fig. 1
Fig. 2
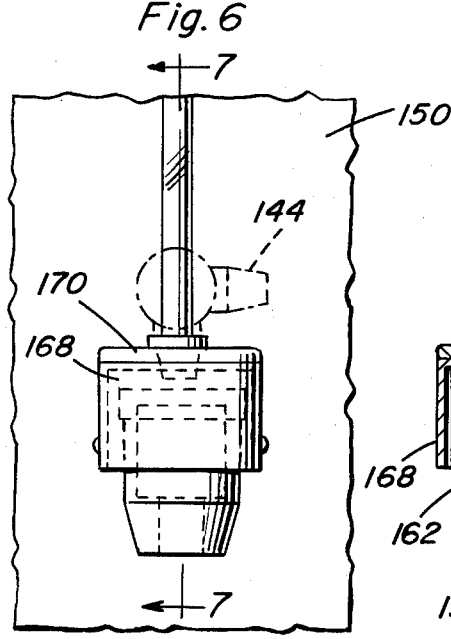
Fig. 6
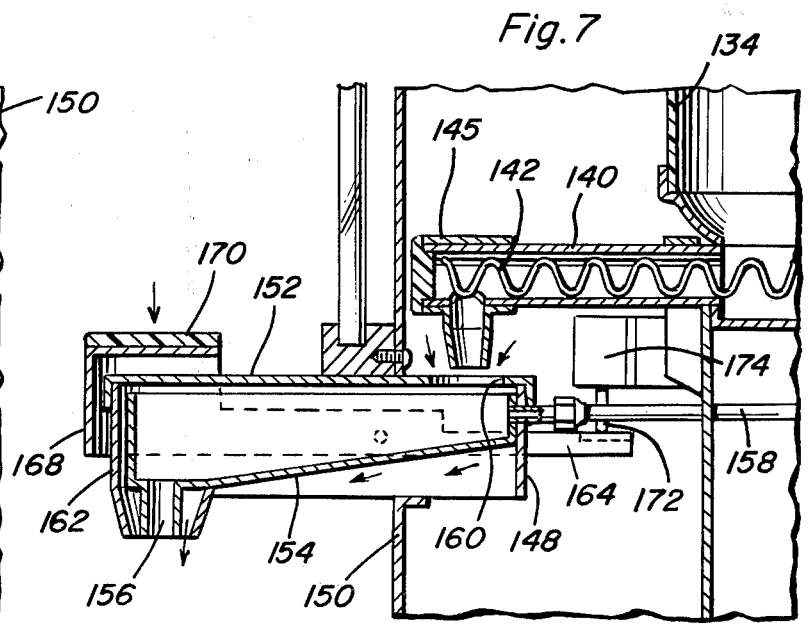
Fig. 7

DEMAND PREPARATION SOLUBLE COFFEE URN

BACKGROUND OF THE INVENTION

1. Field of the Invention

The present invention generally relates to a soluble coffee urn in which freeze-dried coffee powder and hot water are discharged into a mixing area and then discharged through a spigot into a cup or other receptacle upon actuation of an operating handle with the flow of product into the cup or receptacle being controlled by the handle with the urn being constructed to replace existing conventional roasted coffee urns or coffee urns in which a batch of coffee is brewed or made and retained in a heated condition for an extended period of time during which the coffee is consumed, which results in considerable deterioration in the quality of the coffee.

2. Description of the Prior Art

Conventional coffee urns using roasted ground coffee to brew a predetermined large quantity of coffee have found wide acceptance in various food serving establishments, such as restaurants, cafeterias, coffee shops, fast food shops, counter-type diners, and the like, and customers frequently serve themselves or observe the coffee being dispensed from the urn into a cup. One of the problems with this conventional procedure is the deterioration in the quality of the brewed coffee as it remains in the coffee urn while being continuously heated for an extended period of time. Frequently, considerable quantities of brewed coffee must be thrown away and a new batch of coffee must be brewed which, at present day roasted coffee prices, results in in considerable loss of revenue for restaurants, and the like.

Many food establishments have made efforts to utilize freeze-dried coffee since it costs less as it allows a higher extractive yield from the raw material and greatly reduces losses from over-brewing and also provides a better quality product since each cup is "freshly" brewed. However, considerable customer resistance is encountered when the use of freeze-dried coffee is observed or recognized for various practical and psychological reasons.

In some instances, conventional roasted coffee brewing urns have been converted to brew a batch of coffee by using freeze-dried coffee powder. However, the use of such urns results in a relatively large volume of coffee being brewed, for example, three gallons, and the continual heating of this coffee results in deterioration of its quality and taste and still results in considerable wastage if the entire batch is not consumed within a predetermined time period.

Also, various types of dispensing machines have been developed for use with freeze-dried coffee or other powdered food products which involve the discharge of a metered quantity of product along with a quantity of water into a mixing chamber, or the like, with the liquid product then being discharged into a container. Such dispensers usually have an appearance distinctive from a conventional roasted coffee urn and do not include multiple product or multiple service facility and usually meter a single serving for each actuation. The following U.S. patents are exemplary of the developments in freeze-dried coffee machines or powdered food product machines.

U.S. Pat. No: 3,084,613—Apr. 9, 1963
U.S. Pat. No: 3,385,569—May 28, 1968
U.S. Pat. No: 3,568,887—Mar. 9, 1971
U.S. Pat. No: 3,671,020—June 20, 1972
U.S. Pat. No: 4,015,749—Apr. 5, 1977.

Arzberger, et al., U.S. Pat. No. 4,015,749, discloses a machine similar to a number of other freeze-dried coffee dispensers in its function, size, design and components and includes product quantity adjustment by the positioning of an apertured sleeve in surrounding relation to an auger and utilizes a metal plug as the heat sink for dehumidification. The mixing chamber requires a standing vortex of water with the food powder dispensed into its center with the single spout dispensing both coffee and water only subjecting the water to cross-contamination. When automatic filling is discontinued, the machine functions are disconnected until the timer completes a cycle and in addition, the hot water storage and recovery has limited capacity and simultaneous multiple dispensing capacity is not available.

Krup, U.S. Pat. No. 3,671,020, utilizes a final mixing chamber for sugar and water which involves extensive agitation in order to dispense a cold drink on a per serving basis without capability of continuously dispensing. This device requires two mixing chambers, does not include any adjustment of the product being metered, cannot dispense water only and does not include simultaneous multiple dispensing capacity.

Jacobs, U.S. Pat. No. 3,568,887, is a hot chocolate dispenser requiring a whipper assembly and does not include simultaneous, multiple dispensing capacity and utilizes timers to adjust quantity dispensed.

Bookout, U.S. Pat. No. 3,385,569, discloses a cold drink dispenser which also requires a whipper assembly and does not provide simultaneous, multiple dispensing capacity.

Maxson, U.S. Pat. No. 3,084,613, discloses a structure for preventing foaming which occurs to some degree in combining powdered foods with water with the mixed product being stored in the dispenser and which does not provide simultaneous, multiple dispensing capacity.

While dispensing devices for soluble food powders, freeze-dried coffee, and the like, are well-known, such devices have not, for various reasons, replaced conventional roasted coffee urns in restaurants, cafeterias, and other establishments in which coffee is served. While the above-mentioned patents disclose dispensers having various innovative structures involved, they do not satisfy all of the requirements for replacing a conventional roasted coffee urn.

SUMMARY OF THE INVENTION

An object of the invention is to provide a demand preparation soluble coffee urn constructed to provide a replacement for a conventional roasted coffee urn providing double-sided service having one or more coffee outlets per side.

Another object of the present invention is to provide a soluble coffee urn having a product release device constructed in the form of a spigot which operates a switch rather than a valve as in a conventional roasted coffee urn, but has all of the appearance and functional characteristics of a spigot.

A further object of the invention is to provide a soluble coffee urn which includes a mixing chamber which forms a dispensing spigot and which can be removed without mechanical disconnection of components in order to facilitate cleaning.

Yet another object of the invention is to provide a soluble coffee urn in accordance with the preceding objects including a unique dehumidification system utilizing two alternative structures to provide constant flow of dry air past the product discharge area to prevent intrusion of moisture.

Another object of the invention is to provide a soluble coffee urn including a canister and canister lid structure to provide necessary capacity, filling capabilities and sanitation capabilities with the structure simulative of a conventional roasted coffee urn.

Another feature of the present invention is to provide vertical gauges in the form of transparent tubes or rods on the soluble coffee urn to indicate the product being discharged and to simulate "sight glasses" utilized in conventional roasted coffee urns.

Still another important feature of the present invention is to provide a soluble coffee urn in accordance with the preceding objects in which a unique interior component layout is provided including a large capacity hot water tank in association with the other components of the urn to reduce service and maintenance problems and enable the soluble coffee urn to replace conventional roasted coffee urns in an effective manner.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the demand preparation soluble coffee urn illustrating the association of the components thereof.

FIG. 2 is an end elevational view of the construction of FIG. 1.

FIG. 6 is a fragmental front elevational view of the mixing chamber and control switch actuator.

FIG. 7 is a vertical sectional view taken substantially upon a plane passing along section line 7—7 of FIG. 6 illustrating further structural details of the mixing chamber and control switch actuator.

DESCRIPTION OF THE PREFERRED EMBODIMENTS

Figure 3:
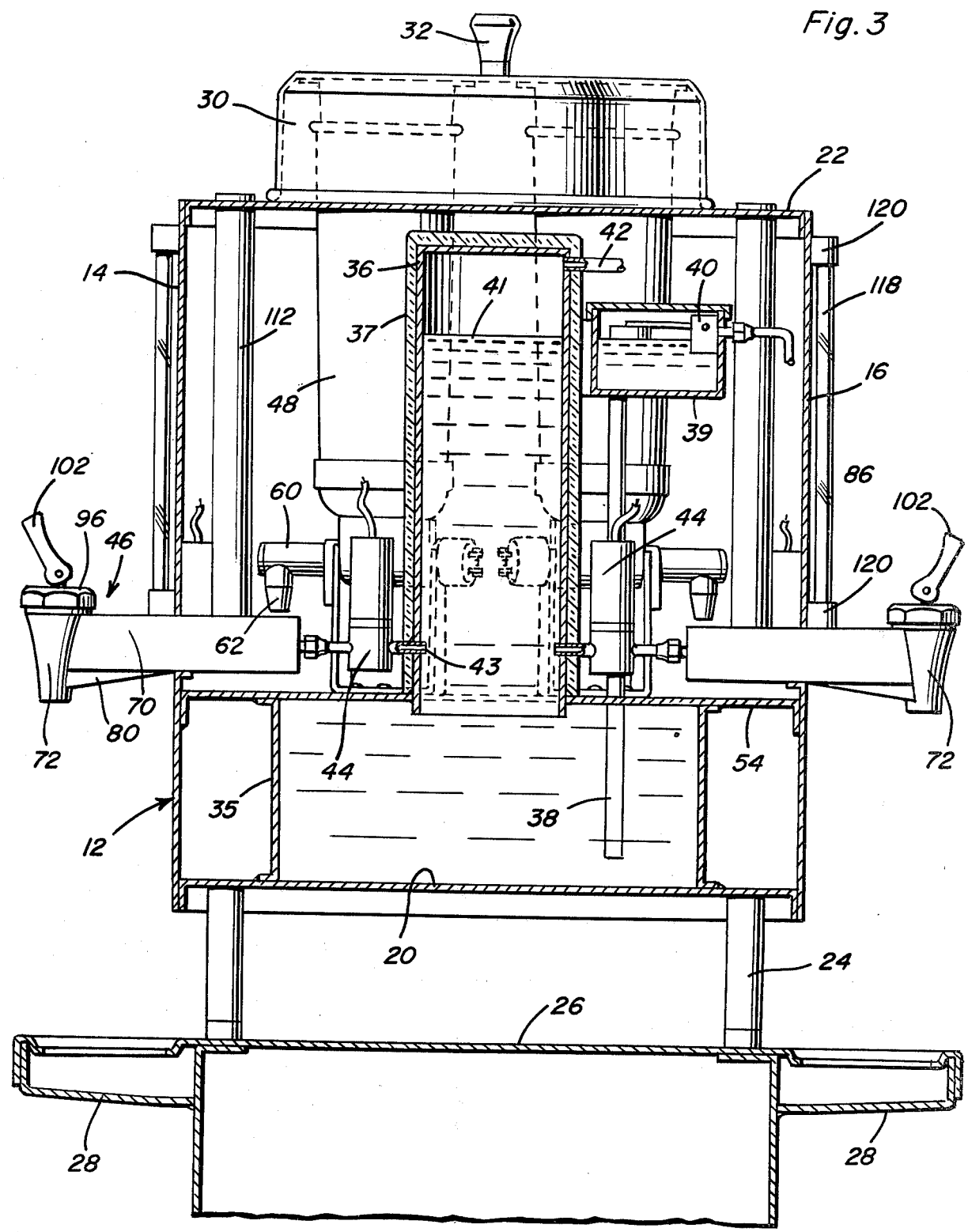
FIG. 3 is a vertical, sectional view taken substantially upon a plane passing along section line 3—3 of FIG. 1 illustrating specific structural details of the urn.

Referring now specifically to FIGS. 1-4, the demand preparation soluble coffee urn of the present invention is designated generally by reference numeral 10 and includes a rectangular housing 12 provided with generally parallel, spaced side walls or panels 14 and 16 interconnected by end walls or panels 18 with the bottom of the housing or cabinet 12 including a bottom wall 20 and the top thereof being provided with a top wall 22, all of which are interconnected in any suitable manner and constructed of conventional sheet metal, such as stainless steel, or the like. The bottom of the housing or cabinet 12 is supported by depending legs 24 engageable with a supporting surface 26 and having laterally extending drain troughs 28 along one or both sides thereof. The soluble coffee urn 10 may be supported in exactly the same location as a conventional roasted coffee urn and the housing or cabinet structure 12 is closely simulative of a conventional urn so that customers observing the urn 10 will recognize it as having the same appearance as a roasted coffee urn.

Disposed on the top wall 22 is a pair of lids 30 of generally cylindrical configuration and provided with a central handle 32 in the form of a knob, or the like. The lids 30 are quite similar in appearance to the cover lids normally provided on a conventional roasted coffee urn. The outermost edge of each lid 30 is supported from the top wall 22 by a hinge structure 34 which enable the lid 30 to be swung upwardly to the broken line position illustrated in FIG. 1 with the hinge structure being such that the lid 30 will be retained in its open position until manually closed.

Disposed in the housing or cabinet 12 is a hot water tank 35 having a vertical standpipe 36 extending upwardly therefrom in the central portion of the cabinet 12. The tank and standpipe may be covered with insulation 37. The tank 35 includes an inlet pipe 38 extending downwardly from a float chamber 39 having a float valve 40 therein which maintains a predetermined water level 41 in standpipe 36. The float valve 40 is connected with a source of cold water and standpipe 36 includes a vent 42. A suitable thermostatically controlled heater element (not shown) is provided in the tank 35. The standpipe 36 is also provided with a plurality of hot water discharge lines 43 each of which is provided with a solenoid valve 44 incorporated therein to control discharge of hot water to a mixing and discharging assembly generally designated by numeral 46.

Figure 4:
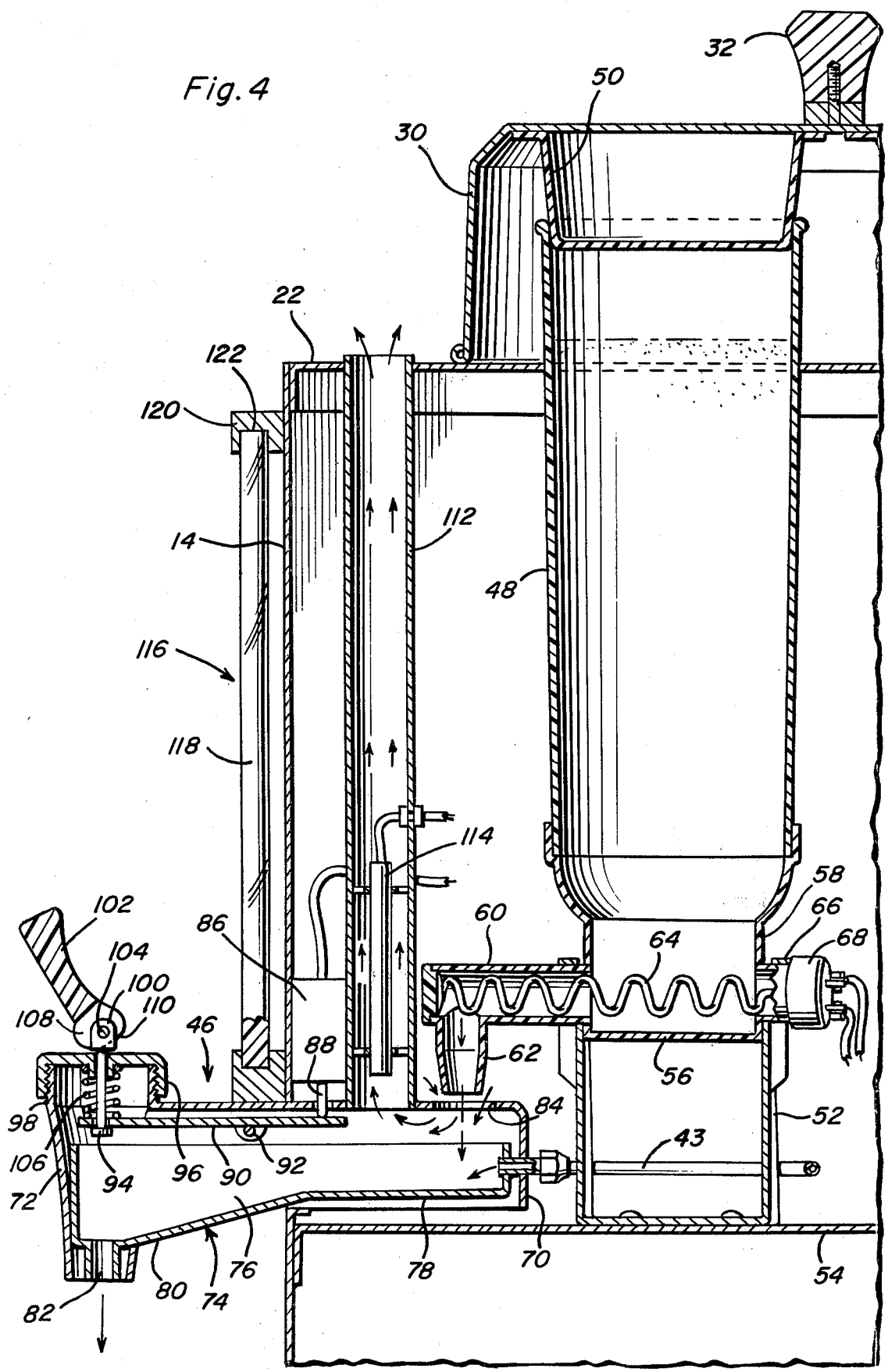
FIG. 4 is a fragmental enlarged sectional view illustrating the specific construction of the mixing chamber and related structure.

Supported in each end portion of the housing 12 is a pair of canisters 48 for receiving freeze-dried coffee or other powdered food products with the upper end of the canister 48 extending above the top wall 22 into the interior of the lid 30. The lower surface of the top portion of the lid is provided with a depending closure plug 50 of tapered configuration or frustoconical in configuration and constructed of relatively soft, resilient material, such as plastic, or the like, to form a seal for the upper end of the canister 48. Thus, when the lid is in closed position, both of the canisters 48 will be closed by a plug 50 and when the lid 30 is pivoted to its open position, both of the canisters 48 will be opened thus facilitating the filling of the canisters 48 with freeze-dried coffee, or the like. The lower end of each canister 48 is supported by a suitable supporting bracket structure 52 attached to a supporting partition or deck 54 disposed interiorly of the housing 12. Also, the lower end of the canister 48 is provided with a bottom wall 56 at the lower end of a reduced lower end portion 58. The reduced lower end portion 58 is provided with a laterally extending delivery tube 60 terminating in a closed end but including a depending discharge nozzle 62 communicating with the outer end portion of the tube 60 as illustrated in FIG. 4. A metering auger 64 is disposed transversely of the reduced end portion 58 of the canister 48 and throughout the length of the discharge tube 60 with the end of the auger 64 opposite to that disposed in the discharge tube 60 extending into an adapter 66 having a drive motor 68 connected thereto and connected to the auger 64 to rotate the auger 64 and discharge freeze-dried coffee or other powdered food from the nozzle 62. The auger 64 and its drive motor is subject to continuous operation as long as the motor 68 is energized which will provide a metered quantity of product to the discharge and mixing assembly 46 with energization of the motor 68 also energizing the solenoid valve 44 to open the discharge line 43 to enable hot water to be discharged into the assembly 46 simultaneously with discharge of the powdered food, freeze-dried coffee, or the like, into the assembly 46.

The discharge and mixing assembly 46 includes a housing 70 which extends through the wall 14 and terminates in a vertically disposed, downwardly tapering nozzle 72 simulative of a spigot. Disposed within the housing 70 is a mixing assembly generally designated by numeral 74 and including an open topped shallow tray 76 having a generally horizontal bottom portion 78 at its inner end and a downwardly inclined bottom portion 80 at its outer end which is provided with a discharge spout or nozzle 82 concentrically arranged with respect to the vertical nozzle 72 on the housing 70 so that coffee will be dispensed therefrom by gravity. The end of the tray 76 remote from the spout or spigot 82 is connected with the hot water supply line 43 as illustrated in FIG. 4. The top wall of the housing 70 is provided with an opening 84 therein in alignment with the discharge nozzle 62 of the auger receiving tube 60 so that product will be dropped by gravity from the discharge nozzle 62, through the opening 84 onto the bottom 78 of the tray 76 with the water and soluble coffee or other powdered product being mixed as the water flows along the surface of the bottom portions 78 and 80 of the tray 76 for discharge from the spout 82.

In order to operate the motor 68 and the valve 44, a switch 86 is provided interiorly of the wall 14 with an actuating plunger 88 depending through the top wall of the housing 70 into engagement with one end of the pivotally mounted switch actuating lever 90 which has a central portion thereof pivoted to the opposite walls of the housing 70 by a transverse pivot pin 92, or the like. The outer end of the actuator or lever 90 is connected to a pin 94 which is slidably mounted through a removable cap 96 on a screw threaded portion 98 of the top wall of the housing 70 and provided with lugs 100 at its upper end pivotally supporting an operating handle 102 for pivotal movement about a pivot pin 104. A compression coil spring 106 biases the pin 94 downwardly and the bottom end edge of the handle 102 includes a rounded cam portion 108 and a flattened cam portion 110 so arranged that when the handle 102 is pulled outwardly, the switch 86 will be actuated as long as pressure is exerted to pull the handle 102 outwardly. When the handle 102 is pushed inwardly, the flat surface 110 engaging the surface of the cap 90 will retain the switch 86 in operative position for continuous discharge of product from the spout 82.

Discharge of hot water into the tray 76 adjacent the nozzle 62 for the powdered product could result in steam vapor causing moisture penetration into the powdered product and caking or clogging of the nozzle 62 or tube 60. In order to preclude this possibility, the nozzle 62 is spaced slightly above the top of the housing 70 and the aperture 84 in the housing 70 is larger than the nozzle 62 thereby providing an air passageway communicating the interior of the housing 70 with the interior of the housing 12 above the tray 76. A vertical, enlarged vent pipe 112 extends from the top wall of the housing 70 adjacent the aperture 84 up through the top wall 22 as illustrated in FIG. 4 with a heater 114 being disposed in the vent pipe 112 which is continuously operated. Optionally, the heater 114 may be cycled in any suitable manner. This arrangement prevents moisture intrusion by maintenance of a constant flow of unheated ambient air across the product delivery aperture as indicated by the air flow arrows in FIG. 4. The heater 114 creates air movement rather than directly warming the aperture and its immediate environs. This precludes the loss of volatile aromatics which occurs when coffee and other food powders are in contact with elevated temperatures for extended periods.

The flue or vent pipe 112 containing the heater 114 which is supported in spaced relation to the inner periphery thereof produces a low pressure chamber within itself and the mixing area. The air flow caused by the heater lowers the pressure within this area rather than raising it in the rest of the cabinet and the specific dimensional characteristics, temperatures and vent pipe or flue construction may be varied as long as the upward flow of heated air and humid air causes inflow of cool and dryer air around the discharge nozzle 62 so that the powdered material in the canister will not absorb vapor from the hot water as it mixes with the powdered food product discharged into the tray and the powdered material will not lose volatile aromatics as it is waiting to be dispensed from the canister thereby retaining maximum flavor characteristics of the product.

Each of the discharge and mixing assemblies has an identification and indicator gauge associated therewith generally designated by 116 which includes a plastic rod or thick walled plastic tube 118 filled with either water or a coffee colored liquid or colored in any manner with the two ends of the rod or tube being supported by opposed brackets 120 having facing sockets 122 therein. It is also possible for the gauges to be labelled by using appropriate indicia on the rod or tube or on a label applied thereto.

Figure 5:
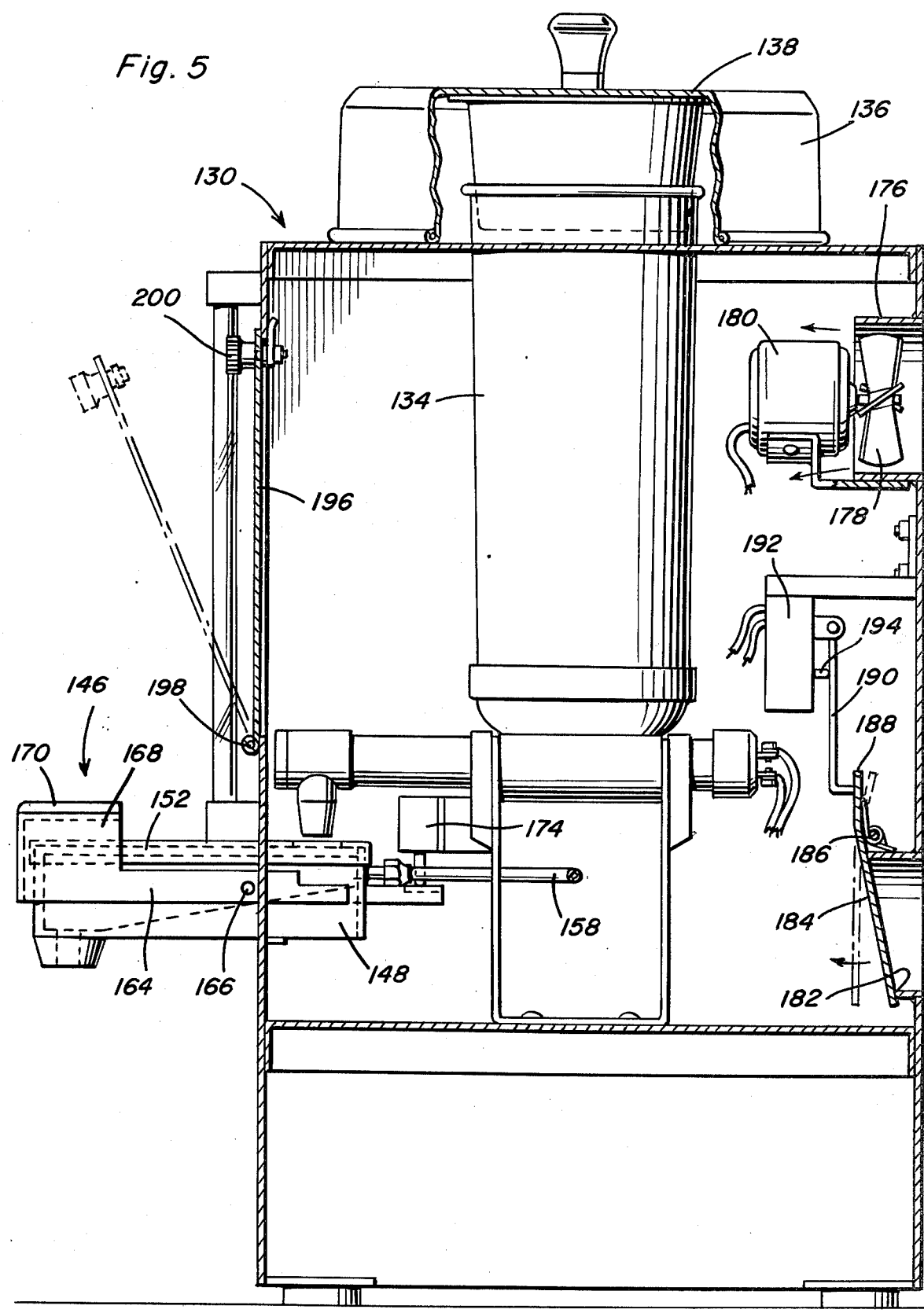
FIG. 5 is a fragmental sectional view of the urn illustrating an alternative construction.

FIGS. 5-7 disclose alternative structures for providing the same functions as the specific structural features disclosed in FIGS. 1-4. In this embodiment, the housing of the urn is generally designated by numeral 130 and is similar in construction to the housing 12 in FIGS. 1-4 with the dispenser normally being placed on a special stand having a built-in drain. The canister 134, closure lid 136, closure plug 138 thereon, discharge tube 140 having the auger 142 therein and the discharge nozzle 144 are substantially the same as the corresponding elements disclosed in FIGS. 1-4.

The discharge and mixing assembly 146 includes a housing 148 supported through the front wall 150 and includes a removable lid 152. Disposed within the housing 148 is an inclined tray 154 having a discharge spout 156 at its lower end and having its other end connected to a hot water inlet pipe 158. The lid 152 is provided with an opening 160 in alignment with but spaced slightly below the discharge nozzle 144 as illustrated in FIG. 4 so that powdered material discharged into the tray 154 will be mixed with water entering the tray from the hot water pipe 158 so that a mixed product will be discharged from the spout 156. The housing 148 also includes a vertically disposed member 162 at the outer end thereof which simulates a spigot and is disposed in concentric spaced relation to the spout 156 so that cool dry air can enter the opening 160 pass around the tray and be discharged between the spout 156 and the vertical member 162 as illustrated in FIG. 7 so that steam vapor will not contact the nozzle 144 or associated portions of the tube 140 and auger 142 to preclude moisture intrusion and prevent elevated temperatures in the structural components and the powder product engaged therewith.

In this embodiment, a generally U-shaped actuator or lever 164 is pivotally attached to the opposite sides of the housing by pivot pins 166 and the other end of the U-shaped lever is provided with a vertically enlarged portion 168 having a push plate 170 across the top end thereof to provide an area for depressing the outer end of the lever 164. The inner end of the lever 164 is engaged with the actuating plunger 172 of a switch 174 which functions to drive the auger and open the solenoid valve in the hot water line 158.

To provide for air flow downwardly through the opening 160, the housing 130 is provided with a screened air inlet 176 adjacent the upper end thereof having a fan 178 therein with a motor 180 driving the fan to move air from the exterior of the housing or cabinet 130 into the interior thereof, thereby providing a positive pressure in the housing. At the lower end of the housing 130, an opening defined by a tubular member 182 is provided and a closure plate 184 forms a closure for the inner end of the tubular member 182 which is inclined so that the pivot axis 186 for the closure plate is such that the closure plate 184 will normally hang vertically in spaced relation to the inclined inner edge of the tubular member 182 as illustrated by the broken line position in FIG. 5. The end of the closure plate 184 which extends above the pivot axis 186, designated by numeral 188, engages a pivotal actuator 190 mounted on a switch 192 in engagement with the operating plunger 194 therefor so that the switch 192 is, in effect, a pressure sensitive switch so that when there is a positive pressure in the housing 130, the pressure plate 184 will be closed and the pressure switch 192 will enable operation of the solenoid valve in the hot water line and the auger when the push plate 170 is depressed and the switch 174 actuated. In the event that the fan 178 is not being driven by the fan motor 180 and the pressure in the housing 130 drops to ambient pressure, the closure plate 184 will move to its vertical position due to gravity, thus enabling the operating lever 190 to pivot and actuate the plunger 194 so that the circuit to the hot water valve will be broken. Even though the differential pressure between the interior of the housing 130 and the pressure exterior thereof is only slight due to the fan 178, it is clearly sufficient to provide a constant flow of dry air past the critical product discharge area, thus preventing the intrusion of moisture and thereby precluding moisture contamination of the highly hygroscopic food powders.

In this construction, a closure door or panel 196 is provided in the front wall 150 of the cabinet with a supporting hinge 198 and latch structure 200 being provided therefor in order to provide access into the interior of the cabinet or housing for repair, replacement, or the like. A similar access panel may be provided in the rear of the cabinet. The pressure switch 192, in addition to deactivating the machine because of fan failure, will also suspend machine operation when either access panel is open or removed thereby protecting against caking problems resulting from unauthorized entry into the dispenser or accidental operation when servicing. A suitable microswitch positioned to be controlled by the position of each access panel could also be used to prevent caking problems.

In this arrangement, the outer end of the tube 140 having the nozzle 144 thereon is constructed so that the nozzle is in the form of a sleeve 145 which enables it to be rotated to the broken line position illustrated in FIG. 6, so that the lid 152 may be removed from the housing 148 to provide access to the tray and associated structure for ease of cleaning and the like.

Figure 8:
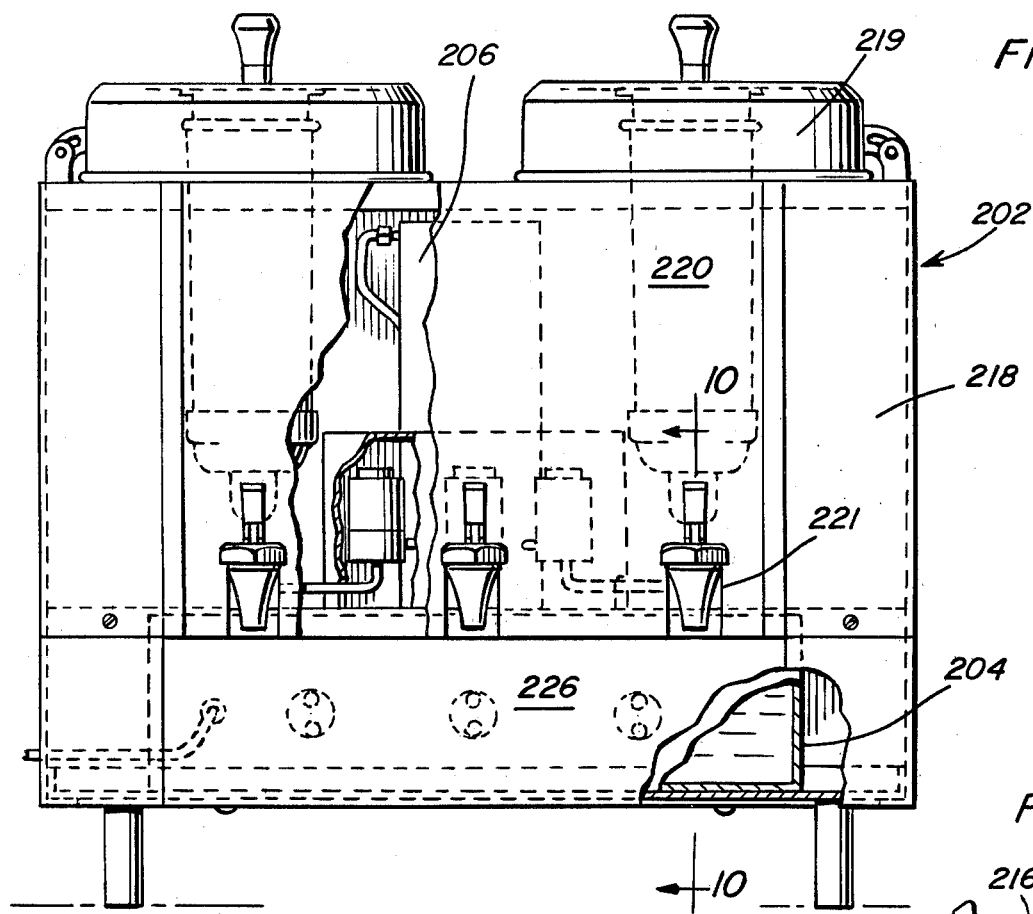
FIG. 8 is a side elevational view of another embodiment of the urn with portions broken away.
Figure 10:
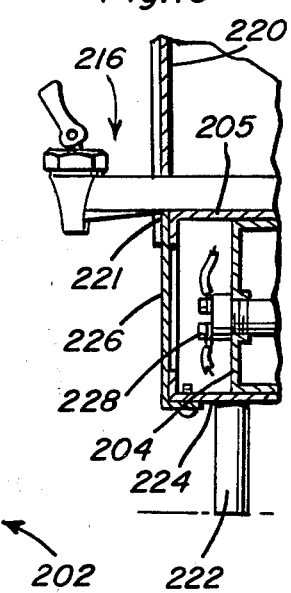
FIG. 10 is a fragmental sectional view passing along section line 10—10 on FIG. 8.
Figure 9:
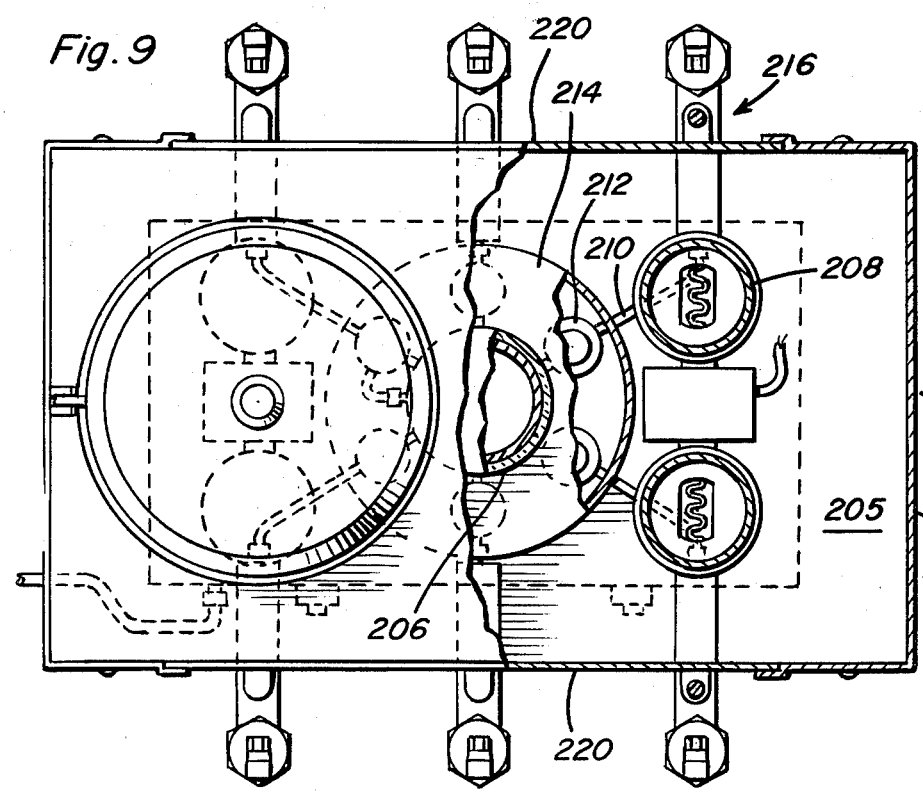
FIG. 9 is a top plan view of FIG. 8.

FIGS. 8–10 illustrate another embodiment of the urn 202 which includes a large hot water tank 204 located below the canisters and the discharge and mixing assemblies and located below deck 205 and acts as a support for it and insulation therebetween. The tank 204 may be of a size to receive approximately ten gallons of water and is communicated with a water supply in a manner similar to that shown in FIG. 3. Communicated with the center of the tank 204 is a vertical stand pipe or extension 206 which is centrally disposed between end pairs of canisters 208. Water discharge lines 210 and control valves 212 are disposed closely adjacent the stand pipe or extension 206 so that the hot water tank 204 and the extension 206 will form an effective heat sink to maintain the discharge pipes 210 and control valves 212 at an elevated temperature. A cover 214 is positioned in enclosing relation to the valves 212 and a portion of the discharge lines 210 to retain the heat from the heat sink in association with these components. The canisters 208 and the hot water supply lines 210 are connected with discharge and mixing assemblies 216 associated with a housing 218 which has closure lids 219 for the canisters 208 in a manner similar to the structure disclosed in the other embodiments of the invention. As illustrated in FIG. 9, the two center assemblies 216 are communicated directly with the tank extension 206 and thus will discharge only hot water when valve 212 is actuated.

To provide access to the interior of the housing 218, side panels 220 may be vertically slidably removed from the top edge of the housing with the lower edge thereof being provided with notches 221 receiving the discharge and mixing assemblies 216 with the indicator gauges mounted on the panel 220, if desired. Also, the tank 204 is supported by suitable supporting legs 222 and a bottom panel 224 extending beyond the tank and provided with a removable panel 226 to enable access to the heater elements 228, thermostatic control, supply valve or other structural components normally concealed by the panel 226. In addition to spatial, structural and maintenance benefits of this arrangement, the direct physical connection to the stand pipe provides the best possible thermal conduction between it and the valves and the discharge lines, so that these components will not absorb substantial heat as the powdered product and water are metered, mixed and dispensed, which can result in a low temperature of the finished product. By eliminating the customary manifold and physically joining each valve to the standpipe and due to its vertical configuration, full flow will be provided through all valves without any pressure or flow fluctuations regardless of the number of valves which may be simultaneously opened. The float valve to control the filling of the water tank may be located in any desired position above the service deck and will fill the tank from the bottom so that the float valve chamber will be filled with cool or cold water which reduces mineral build-up, corrosion and rusting of the float valve components.

In each instance, suitable heating elements, controls therefor and controls for maintaining the water supply in the tank are utilized and may be of various conventional components. Also, sanitation and health requirements of various jurisdictions may be easily complied with along with regulations relating to plumbing and electrical installations.

The soluble coffee urns provide a mixed coffee product which not only is closely simulative of the brewed coffee from roasted ground coffee but also is dispensed from an apparatus which is quite simulative of a conventional roasted coffee urn. In addition, the mixing of the freeze-dried coffee and water immediately before discharge enables a relatively high water temperature to be used so that the coffee will be quite hot which is significant when feeding in various institutions, such as hospitals, and the like, where substantial delay may be encountered in delivering the coffee to the actual consumer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A soluble coffee urn comprising a housing, a canister in said housing for freeze-dried coffee, hot water supply means in said housing, a discharge and mixing assembly projecting from said housing and communicated with the canister and the hot water supply means, said discharge and mixing assembly including manually actuated means for discharging freeze-dried coffee and hot water into the discharge and mixing assembly for blending and dispensing coffee into a receptacle continuously while the manually actuated means is actuated, a lid on said housing forming a closure for said canister, said housing, said lid, said manually actuated means and the portion of said discharge and mixing assembly disposed externally of the housing being constructed to simulate the shape, size and appearance of a conventional roasted coffee urn thereby enabling the soluble coffee urn to replace a conventional roasted coffee urn so that discharge of mixed coffee from the soluble coffee urn will simulate the discharge of brewed coffee from a conventional roasted coffee urn and an observer will not recognize that a roasted coffee urn has been replaced by the soluble coffee urn, said hot water supply means including a hot water tank having a plurality of discharge lines communicated therewith, each of said discharge lines having a control valve therein for controlling discharge of hot water therefrom, said hot water tank, said discharge lines and said control valves being closely associated whereby the hot water tank and the hot water therein forms a heat sink for maintaining the discharge lines and the control valves heated during periods of non-use so that initial water discharged after a long period of non-use will be at an elevated temperature, said discharge valves being in communication with the hot water tank, said tank including a vertical portion to provide full flow through all of said valves without pressure and flow fluctuations regardless of the number of said valves which may be opened simultaneously.

2. The structure as defined in claim 1 wherein said housing is generally rectangular with a plurality of discharge and mixing assemblies along each side thereof for double-sided service and simultaneous multiple discharge capacity.

3. The structure as defined in claim 2 wherein at least one of said discharge and mixing assemblies on each side of the housing is communicated only with the hot water supply means and the manually actuated means associated with said at least one discharge and mixing assembly discharging only hot water thereby enabling discharge of only hot water into a receptacle when desired.

4. The structure as defined in claim 1 wherein said canister includes discharge means at the lower end thereof for discharging freeze-dried coffee into the discharge and mixing assembly, and pressure differential means circulating dry air downwardly around and through the area of discharge of freeze-dried coffee and hot water into the discharge and mixing assembly.

5. The structure as defined in claim 4 wherein said means circulating dry air includes a vertically disposed vent pipe having an upper end communicated with ambient atmosphere at the top of the housing and a lower end communicated with the area adjacent the point of discharge of freeze-dried coffee into the discharge and mixing assembly, and a heater disposed in the vent pipe to heat air therein and induce vertical air flow from the bottom end of the pipe to the upper end thereof thereby moving air from the interior of the housing downwardly past the area of discharge of freeze-dried coffee into the discharge and mixing assembly so that any vapor produced by hot water discharged into the discharge and mixing assembly will be entrained in the circulating air and discharged from the upper end of the vent pipe.

6. The structure as defined in claim 4 wherein said air circulating means includes a fan mounted in said housing and communicated with ambient atmosphere to provide a positive pressure in the housing slightly greater than ambient atmospheric pressure, said discharge and mixing assembly including means enabling discharge of air from the interior of the housing to the exterior thereof with such air passing through and around the area of discharge of freeze-dried coffee into the discharge and mixing assembly, and pressure sensitive switch means associated with said housing to sense pressure differential between the interior of the housing and ambient atmosphere to render the discharge and mixing assembly inoperative when the pressure within the housing is not greater than ambient atmospheric pressure thereby assuring that air flowing past the area of discharge of freeze-dried coffee will prevent moisture penetration into the freeze-dried coffee thereby preventing caking or solidifying of the freeze-dried coffee in the canister or discharge means.

7. The structure as defined in claim 1 together with a vertically disposed external indicator means mounted on said housing in alignment with the discharge assembly for indicating the product which can be discharged from the discharge and mixing assembly.

8. A soluble coffee urn comprising a housing, a canister in said housing for freeze-dried coffee, hot water supply means in said housing, a discharge and mixing assembly projecting from said housing and communicated with the canister and the hot water supply means, said discharge and mixing assembly including manually actuated means for discharging freeze-dried coffee and hot water into the discharge and mixing assembly for blending and dispensing coffee into a receptacle continuously while the manually actuated means is actuated, a lid on said housing forming a closure for said canister, said housing, said lid, said manually actuated means and the portion of said discharge and mixing assembly disposed externally of the housing being constructed to simulate the shape, size and appearance of a conventional roasted coffee urn thereby enabling the soluble coffee urn to replace a conventional roasted coffee urn so that discharge of mixed coffee from the soluble coffee urn will simulate the discharge of brewed coffee from a conventional roasted coffee urn and an observer will not recognize that a roasted coffee urn has been replaced by the soluble coffee urn, said housing being generally rectangular with a plurality of discharge and mixing assemblies along each side thereof for double-sided service and simultaneous multiple discharge capacity, said housing including a plurality of canisters with two canisters adjacent each end of the housing and being disposed in transverse alignment with the upper end of the canister being open and disposed adjacent the upper end of the housing, said housing including two lids, each of the lids being generally cylindrical and having a large diameter to encompass the upper end of two of the adjacent canisters, each of the lids including an extended vertical height to enable the canisters to project through the top of the housing to provide for institutional capacity and reducing moisture intrusion by increasing the distance for moisture to migrate along the underside of the lid by capillary action before it reaches the storage area and to contribute to maximum interior air volume to dissipate, dilute and neutralize intruded moisture, each of the lids including a pair of depending, soft tapered plugs connected to the top wall of the lid for providing a sealed closure for the canisters when the lid is in closed position.

9. The structure as defined in claim 8 together with hinge means securing a peripheral portion of each of the lids to the housing to support the lids in substantially vertical stored position when opened to facilitate filling of the canisters.

10. A soluble coffee urn comprising a housing, a canister in said housing for freeze-dried coffee, hot water supply means in said housing, a discharge and mixing assembly projecting from said housing and communicated with the canister and the hot water supply means, said discharge and mixing assembly including manually actuated means for discharging freeze-dried coffee and hot water into the discharge and mixing assembly for blending and dispensing coffee into a receptacle continuously while the manually actuated means is actuated, a lid on said housing forming a closure for said canister, said housing, said lid, said manually actuated means and the portion of said discharge and mixing assembly disposed externally of the housing being constructed to simulate the shape, size and appearance of a conventional roasted coffee urn thereby enabling the soluble coffee urn to replace a conventional roasted coffee urn so that discharge of mixed coffee from the soluble coffee urn will simulate the discharge of brewed coffee from a conventional roasted coffee urn and an observer will not recognize that a roasted coffee urn has been replaced by the soluble coffee urn, said discharge and mixing assembly including a generally horizontally disposed, shallow, open-topped tray having a bottom slanting downwardly from an inner end portion to an outer end portion exteriorly of the housing, said hot water supply means being communicated with the inner end portion of the tray for discharging hot water onto the inner end portion of the bottom of the tray, said canister including discharge means for discharging freeze-dried coffee vertically downwardly onto the inner end portion of the bottom of the tray in the same area as hot water is discharged into the tray for mixing with and being dissolved by the hot water as the hot water and freeze-dried coffee move along the bottom of the tray from the inner end portion to the outer end portion thereof, the outer end portion of said tray including a spout depending therefrom for discharging mixed coffee into a cup or receptacle, said manually actuated means being manually moved to actuate the freeze-dried coffee discharge means and to discharge hot water into the tray.

11. The structure as defined in claim 10 wherein said hot water supply means includes an electrically operated valve and the freeze-dried coffee discharge means including an electrically actuated auger, said manually actuated means including a switch for energizing the hot water valve and the auger continuously as long as the switch is actuated.

12. The structure as defined in claim 11 wherein said manually actuated means includes a pivotal handle mounted exteriorly of the housing, a lever interconnecting the handle and the switch to actuate the switch and the valve when the lever is pivoted, said handle including an arcuate cam portion and a flat cam portion engaging the lever to provide manual control of the valve when the arcuate cam portion is engaged with the lever or continuous actuation thereof when the flat cam portion is engaged with the lever, said handle being simulative of a handle controlling the discharge spigot of a conventional roasted coffee urn whereby operation of the soluble coffee urn to discharge mixed coffee into a cup or other receptacle is substantially identical to the operation followed to discharge brewed coffee from a roasted coffee urn.

13. The structure as defined in claim 11 wherein said manually actuated means includes a push plate located exteriorly of the housing and connected with the switch through a pivot lever means, said push plate being horizontally disposed in spaced relation to the housing for downward depression upon application of manual pressure for discharge of mixed coffee from the spout as long as the push plate is depressed.

14. The structure as defined in claim 11 wherein said auger includes a generally horizontally disposed tube provided with a sleeve at the end thereof overlying the inner end portion of the tray, said sleeve including a depending nozzle extending toward the tray, said sleeve being rotatably mounted on the tube to enable the nozzle to be rotated away from the tray to facilitate cleaning the tray.

15. The structure as defined in claim 10 wherein said tray bottom inclines continuously from the inner end portion to the outer end portion, and a removable cover for said tray to enable cleaning thereof.

16. The structure as defined in claim 10 wherein the inner end portion of the tray bottom includes a generally flat portion into which the freeze-dried coffee and the hot water are discharged.

17. A soluble coffee urn comprising a housing, a canister in said housing for freeze-dried coffee, hot water supply means in said housing, a discharge and mixing assembly projecting from said housing and communicated with the canister and the hot water supply means, said discharge and mixing assembly including manually actuated means for discharging freeze-dried coffee and hot water into the discharge and mixing assembly for blending and dispensing coffee into a receptacle continuously while the manually actuated means is actuated, a lid on said housing forming a closure for said canister, said housing, said lid, said manually actuated means and the portion of said discharge and mixing assembly disposed externally of the housing being constructed to simulate the shape, size and appearance of a conventional roasted coffee urn thereby enabling the soluble coffee urn to replace a conventional roasted coffee urn so that discharge of mixed coffee from the soluble coffee urn will simulate the discharge of brewed coffee from a conventional roasted coffee urn and an observer will not recognize that a roasted coffee urn has been replaced by the soluble coffee urn, said housing being generally rectangular with a plurality of discharge and mixing assemblies along each side thereof for double-sided service and simultaneous multiple discharge capacity, said hot water supply means including an enlarged tank disposed below and forming a support for the housing and associated components, said tank including a vertically disposed extension disposed centrally of the housing with hot water discharge lines radiating therefrom, electrically operated control valves for said discharge lines with the control valves being disposed adjacent the vertical tank extension whereby the hot water will provide a heat sink for the discharge lines and the valves, and a cover for the valves to further retain the valves and the discharge lines at an elevated temperature.

18. A soluble coffee urn comprising a housing, a canister in said housing for freeze-dried coffee, hot water supply means in said housing, discharge and mixing assembly projecting from said housing and communicated with the canister and the hot water supply means, said discharge and mixing assembly including manually actuated means for discharging freeze-dried coffee and hot water into the discharge and mixing assembly for blending and dispensing coffee into a receptacle continuously while the manually actuated means is actuated, a lid on said housing forming a closure for said canister, said housing, said lid, said manually actuated means and the portion of said discharge and mixing assembly disposed externally of the housing being constructed to simulate the shape, size and appearance of a conventional roasted coffee urn thereby enabling the soluble coffee urn replace a conventional roasted coffee urn so that discharge of mixed coffee from the soluble coffee urn will simulate the discharge of brewed coffee from a conventional roasted coffee urn and an observer will not recognize that a roasted coffee urn has been replaced by the soluble coffee urn, said housing including a plurality of canisters with two canisters adjacent each end of the housing and being disposed in transverse alignment with the upper end of the canister being open and disposed adjacent the upper end of the housing, said housing including two lids, each of the lids being generally cylindrical and having a large diameter to encompass the upper end of two of the adjacent canisters, each of the lids including an extended vertical height to enable the canisters to project through the top of the housing to provide for institutional capacity and reducing moisture intrusion by increasing the distance for moisture to migrate along the underside of the lid by capillary action before it reaches the storage area and to contribute to maximum interior air volume to dissipate, dilute and neutralize intruded moisture, each of the lids including a pair of depending, soft tapered plugs connected to the top wall of the lid for providing a sealed closure for the canisters when the lid is in closed position.

19. An urn for discharging a hot liquid product into a receptacle capable of being moved away from the urn, said urn comprising a supply canister for a soluble powdered product, auger discharge means associated with the lower end of the canister for discharging powdered product therefrom, mixing tray means receiving powdered product from the auger discharge means, a hot water supply means discharging hot water into the tray means for mixing with and dissolving the product, said tray means including an inclined bottom surface onto which the product and hot water are discharged for mixing, a discharge spout at the lower end of the inclined bottom surface for discharge of the mixed product and hot water therefrom, and manually actuated means for simultaneously actuating the auger discharge means and hot water supply means, said tray means including a cover having an opening therein through which powdered product falls from the auger discharge means, and means forming a pressure differential between the area above the cover and the area below the cover to cause downflow of air through the opening to prevent moisture from passing upwardly through the opening.

20. The structure as defined in claim 19 wherein said urn includes a housing enclosing the components of the urn except for the manually actuated means, said manually actuated means and housing being constructed in the shape, size, appearance and exterior configuration of a roasted coffee urn and providing a choice of single or double-sided operation, a very large capacity for delivering coffee and water with a high recovery rate and accommodating existing equipment layouts, traffic flow patterns, electrical service, plumbing connections and water sources without any change.

21. The structure as defined in claim 19 wherein said urn includes a housing having a top wall, said canister having an open upper end projecting above the top wall in sealed relation thereto to enable filling of the canister without spillage into the interior of the housing and facilitate visual location of the canister and observation thereof when filling.

22. The structure as defined in claim 19 wherein said hot water supply means includes a hot water supply tank and said manually actuated means includes a hot water valve, said urn including a housing and being convertible between single and double sided operation by selecting the number of the auger discharge means communicated with the canister and the number of the tray means and the manually actuated means.

23. The structure as defined in claim 22 wherein said urn includes multiple canisters and associated components to enable multiple products to be dispensed.

24. The structure as defined in claim 19 wherein said urn includes a housing enclosing the auger discharge means and the opening in the cover, said means forming a pressure differential including fan means to maintain above atmospheric pressure in the housing, and means controlling the auger discharge means and hot water supply means to prevent operation thereof when the pressure in the housing drops to atmospheric pressure.

25. The structure as defined in claim 19 wherein said urn includes a housing enclosing the auger discharge means and the opening in the cover, said means forming a pressure differential including a vertical vent tube extending upwardly from the cover adjacent the opening therein, means in the vent tube for causing upward flow of air therein, said vent tube communicating with the tray means and the area below the cover to provide a reduced pressure in such area thereby causing downflow of air through the opening.

26. An urn for discharging a hot liquid product into a receptacle capable of being moved away from the urn, said urn comprising a supply canister for a soluble powdered product, auger discharge means associated with the lower end of the canister for discharging powdered product therefrom, mixing tray means receiving powdered product from the auger discharge means, a hot water supply means discharging hot water into the tray means for mixing with and dissolving the product, said tray means including an inclined bottom surface onto which the product and hot water are discharged for mixing, a discharge spout at the lower end of the inclined bottom surface for discharge of the mixed product and hot water therefrom, and manually actuated means for simultaneously actuating the auger discharge means and hot water supply means, said urn including a housing enclosing the components of the urn except for the manually actuated means, said manually actuated means and housing being constructed in the shape, size, appearance and exterior configuration of a roasted coffee urn and providing a choise of single or double-sided operation, a very large capacity for delivering coffee and water with a high recovery rate and accommodating existing equipment layouts, traffic flow patterns, electrical service, plumbing connections and water sources without any change, said canister having an open upper end, said housing including a lid enclosing the upper end of the canister, and a closure plug on said lid forming a moisture proof closure for the open upper end of the canister by telescoping into the open upper end thereof when the lid is disposed in a generally horizontal position on the housing.

* * * * *